Figure 1:
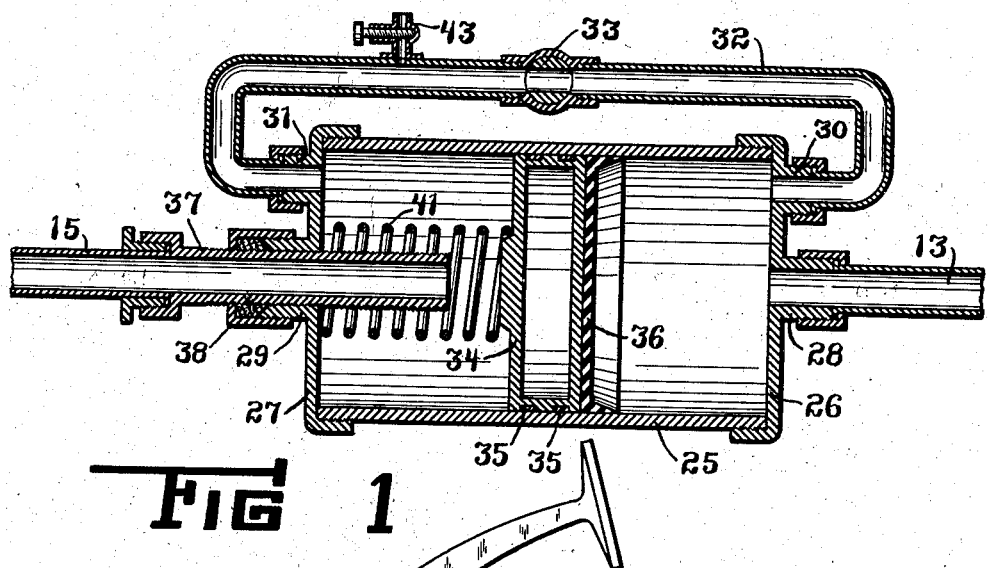

Nov. 2, 1937.  F. O. MILLER  2,097,889

HYDRAULIC BRAKING SYSTEM

Filed Dec. 20, 1935

F O MILLER
INVENTOR

ATTORNEY

Patented Nov. 2, 1937

2,097,889

UNITED STATES PATENT OFFICE 2,097,889

HYDRAULIC BRAKING SYSTEM

Floyd O. Miller, Akron, Ohio

Application December 20, 1935, Serial No. 55,377

2 Claims. (Cl. 303—84)

This invention relates to improvements in hydraulically operable means for transmitting force from a force imparting device to a plurality of fluid operated devices and while adapted for use generally wherever it may be advantageously employed, the invention is particularly intended to provide an improved hydraulic braking apparatus for motor vehicles in which connection it will be illustrated in the drawing and hereinafter specifically described.

In hydraulic brake systems commonly used on automobiles and other vehicles, a plurality of tubes transmit a fluid from a master cylinder to fluid operated braking devices on each wheel. In case one of the tubes is broken the resultant leakage will render the entire system inoperable.

It is an object of this invention to provide means for limiting any leakage to the particular tube in which it may occur and to thereby provide a hydraulic braking system which in case of leakage in a tube leading to one wheel will operate efficiently through tubes leading to the other wheels and to thereby provide means whereby a defective line or lines can be automatically isolated from the remainder of the system without affecting the operation or impairing the efficiency of any of the remaining lines in the system.

A particular object is to provide an improved valve which may be operatively interposed in a line leading from a master cylinder or other force imparting device to a hydraulically operable braking mechanism or other device, which in case of breakage will limit loss of fluid to a particular line.

An additional object is to provide a valve having a piston slidably mounted therein for receiving fluid under pressure from a master cylinder and transmitting the pressure to fluid in the line leading to the braking mechanism; to provide a valve controlled passage leading from said valve for use in completely filling the system with an operating fluid or adjusting the position of the piston in the valve and to provide regulatable means for limiting the movement of the piston whereby the operation of the braking mechanism may be accurately regulated.

The above objects are accomplished and additional ends are attained by the improved system, the construction and arrangement of parts hereinafter described with reference to the accompanying drawing in which an illustrative embodiment of the invention is shown, it being understood that the invention is not confined to the particular embodiment illustrated and that changes and modifications may be made or resort had to substitutions which come within the scope of the claims hereunto appended.

Figure 2:
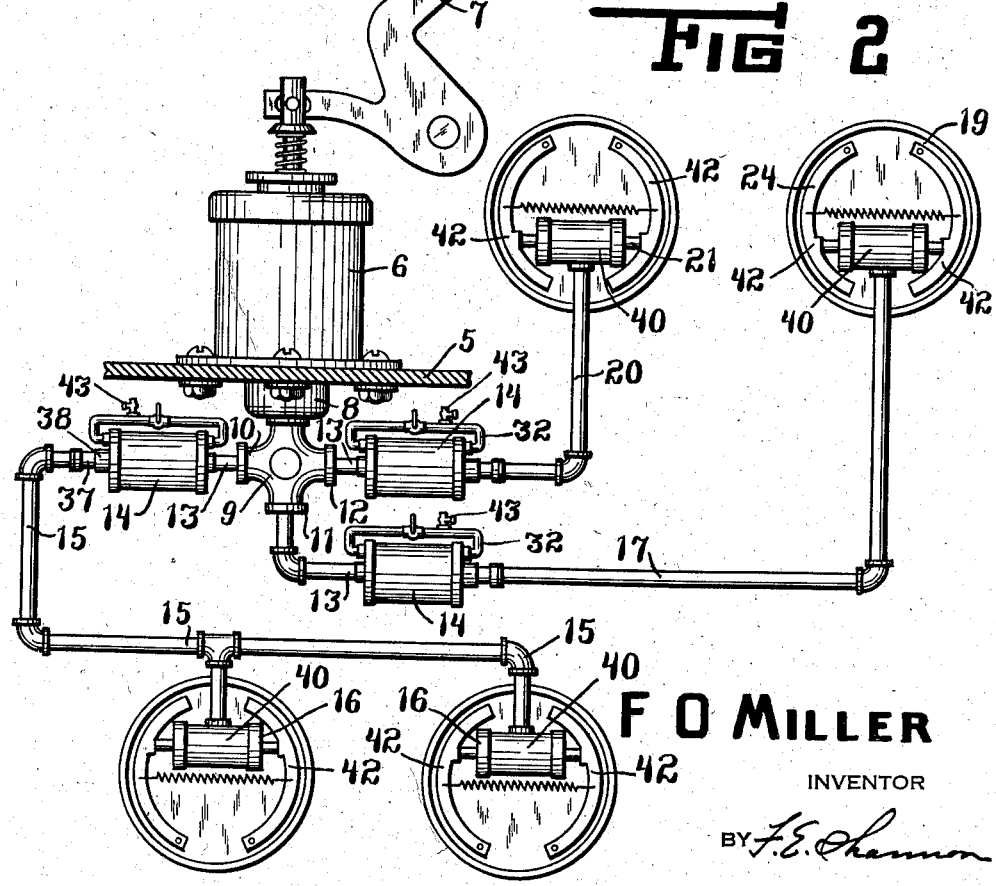

In the drawing:

Figure 1 is a central, longitudinal sectional view of a valve constructed in accordance with this invention, Figure 2 is a diagrammatic view of a braking system having the valve shown in Figure 1 operatively imposed therein.

Proceeding now to a detailed description of the invention with reference to the particular adaptation thereof disclosed in the drawing, the numeral 5 is used to denote a portion of a frame or other part of a vehicle in which a master cylinder 6 is mounted. The master cylinder 6 may be of any suitable construction and is operated by a foot pedal 7. The master cylinder is provided with a suitable outlet casing 8 to which is operatively secured a four-way coupling 9. The coupling 9 is provided with a plurality of outlet nipples 10, 11 and 12. The numeral 13 denotes tubes, one of which lead from each of the nipples 10, 11 and 12 to the valves 14, one of which is operatively secured to each of the tubes 13.

In the particular adaptation of the invention shown, the tube 15 leads to the braking mechanism 16 on the front wheels from the valve 14 thus secured to the nipple 19. A like valve 14 is operatively attached to the tube 13 leading from the nipple 11 and a tube 17 leads from said valve 14 to the braking mechanism 19 on one of the rear walls of the vehicle. A like valve 14 is likewise attached to the tube 13 leading from the nipple 12 and a tube 20 leads from said valve 14 to the braking mechanism 21 on the other rear wall of the vehicle.

The valve 14 includes a hollow cylinder 25 having a cap 26 threaded or otherwise suitably secured on one end thereof and a similar cap 27 likewise secured in the other end thereof. The cap 26 is provided with an inlet nipple 28 and the cap 27 with an outlet nipple 29 which is axially positioned thereon. The cap 26 is provided adjacent the upper edge thereof with a nipple 30 and the cap 27 with a nipple 31 and a tube 32 operatively connects the nipples 30 and 31, a valve 33 being operatively interposed in the tube 32.

The numeral 34 denotes a cylindrical piston which is mounted in the cylinder 25. The piston 34 may be provided with suitable packing rings 35 and in the particular adaptation thereof disclosed in the drawing, there is shown an additional packing gasket 36 which is composed of rubber, leather or other suitable material and is suitably secured to the piston to seal the same against pressure from the inlet side of the casing 25. The outlet nipple 29 is interiorly threaded and an outlet pipe 37 is operatively positioned therein. The outlet pipe 37 projects axially into the cylinder 25 and functions to limit the movement of the piston 34 as hereinafter described. A suitable packing gland 38 is positioned on the nipple 29 to maintain a fluid tight joint between the nipple 29 and the pipe 37. The packing gland also serves to lock the pipe 37 against rotation.

In use, the nipple 28 is operatively secured to the pipe 13 and the outlet pipe 37 is operatively secured to one of the lines 15, 17 or 20 leading to the braking mechanism. The valve 33 is opened and the pedal 7 operated to force fluid from the master cylinder 6 through the pipe 13 to the inlet side of the cylinder 25. As the inlet side becomes filled the fluid will be forced through the tube 32 to the other side of the piston 34 until the cavity of the cylinder 25 is completely filled, whereupon the fluid will be forced through the outlet pipe 37 and the tube 15 to the cylinders 40 in the braking mechanism.

A coil spring 41 is mounted in the cylinder 25 with one end thereof positioned against the cap 27 and the other end thereof against the piston 34 to yieldably hold the piston in a position adjacent the inlet end of the cylinder.

When the system is thus completely filled with oil the valve 33 in each cylinder 25 is closed. It will be seen that pressure applied to the pedal 7 will force liquid from the master cylinder 6 into the receiving end of each cylinder 25, thereby moving the piston 34 in the cylinder and forcing the liquid in the outlet end of the cylinder through the outlet tubes 37 and through the pipes 15, 17 and 20 to the cylinder 40, thus expanding the brake shoes 42 and applying the brakes on all four wheels.

It will be seen that should one of the tubes 15, 17 or 20 become broken that the piston 36 will be moved forwardly into contact with the end of the pipe 37, thus limiting the loss of fluid to the particular line in which the leakage may occur. It will also be seen that the resultant movement of the piston 34 will not be sufficient to materially affect the operation of the brakes on the other wheels. Should such leakage occur in any line, the line can be disconnected and the pipe 37 operated to position the end thereof against the piston 34, thus maintaining the original pedal action. A suitable bleeding valve 43 is provided to release trapped air from the system and to provide a solid column of fluid on each side of the piston 34.

While I have illustrated and described an adaptation of the invention in which a piston is slidably mounted in a casing, it is understood that the fluid in the system may be divided by any suitable element interposed directly in the line or in any appropriate casing for limited movement with the liquid and while I have shown a piston 34 mounted in a cylinder which is operatively interposed in a hydraulic line, it will be seen that a piston 34 or other movable part having the same function can be built into the master cylinder.

Having thus illustrated my invention and described the same in detail, what I claim as new and desire to secure by Letters Patent is:—

1. In a device of the character described, a cylindrical casing, a piston mounted therein, said casing having an inlet opening in one end thereof and provided with an outlet opening in the other end thereof, an outlet tube adjustably secured in said outlet opening and projecting into said casing to limit the movement of said piston, said piston adapted to close the bore of said tube when brought into operative contact therewith and means to operatively interpose said casing in a fluid pressure line.

2. In a device of the character described, a cylindrical casing, a piston mounted therein; an inlet opening in one end of said casing, an outlet opening in the other end thereof, a spring normally urging said piston toward the inlet end of said casing, and an outlet tube adjustably secured in said outlet opening, said tube projecting into said casing to limit the movement of said piston.

FLOYD O. MILLER.